(12) United States Patent
Wang et al.

(10) Patent No.: US 6,728,998 B2
(45) Date of Patent: May 4, 2004

(54) WOVEN HOOK AND LOOP FASTENING

(75) Inventors: Der-Shi Wang, Bedford, NH (US); David E. Godlewski, Goffstown, NH (US)

(73) Assignee: Velcro Industries B.V., Curacao (NL)

( * ) Notice: Subject to any disclaimer, the term of this patent is extended or adjusted under 35 U.S.C. 154(b) by 0 days.

(21) Appl. No.: 10/341,808

(22) Filed: Jan. 14, 2003

(65) Prior Publication Data

US 2003/0101549 A1 Jun. 5, 2003

Related U.S. Application Data

(63) Continuation of application No. 09/456,281, filed on Dec. 7, 1999, now Pat. No. 6,546,603, which is a continuation-in-part of application No. 09/050,501, filed on Mar. 30, 1998, now Pat. No. 5,996,189.

(51) Int. Cl.[7] .......................... A44B 18/00; B29C 41/30; B32B 3/06
(52) U.S. Cl. .............................. 24/451; 24/442; 24/447; 24/448; 24/452; 24/265 WS
(58) Field of Search .......................... 24/451, 450, 452, 24/445, 446, 447, 448, 265 WS, 442

(56) References Cited

U.S. PATENT DOCUMENTS

| | | | | |
|---|---|---|---|---|
| 2,717,437 A | * | 9/1955 | DeMestral | 428/99 |
| 3,261,069 A | * | 7/1966 | Mathison | 24/446 |
| 3,319,307 A | * | 5/1967 | Marforio | 24/445 |
| 3,387,345 A | * | 6/1968 | Savoir | 24/446 |
| 3,405,430 A | * | 10/1968 | Sidelman | 128/876 |
| 3,426,363 A | * | 2/1969 | Girard | 24/445 |
| 3,469,289 A | * | 9/1969 | Whitacre | 428/95 |
| 3,555,630 A | * | 1/1971 | Wylde | 428/218 |
| 3,747,171 A | * | 7/1973 | Montague, Jr. | 24/446 |
| 4,646,397 A | * | 3/1987 | Yoshida | 24/446 |
| 4,654,246 A | * | 3/1987 | Provost et al. | 24/446 |
| 4,818,580 A | * | 4/1989 | Bottger et al. | 442/207 |
| 4,878,274 A | * | 11/1989 | Patricy | 24/442 |
| 4,999,067 A | * | 3/1991 | Erb et al. | 24/16 PB |
| 5,048,158 A | * | 9/1991 | Koerner | 24/442 |
| 5,081,748 A | * | 1/1992 | Eberle | 24/16 R |
| 5,086,543 A | * | 2/1992 | Mitchell | 156/73.1 |
| 5,136,759 A | * | 8/1992 | Armour, II | 24/306 |
| 5,169,709 A | * | 12/1992 | Fleischer | 428/113 |
| 5,231,738 A | * | 8/1993 | Higashinaka | 428/88 |
| 5,369,852 A | * | 12/1994 | Higashinaka | 24/442 |
| 5,369,853 A | * | 12/1994 | Okawa et al. | 24/265 WS |
| 5,399,418 A | * | 3/1995 | Hartmanns et al. | 24/447 |
| 5,436,051 A | * | 7/1995 | Donaruma et al. | 24/450 |
| 5,457,855 A | * | 10/1995 | Kenney et al. | 2/338 |
| 5,492,133 A | * | 2/1996 | McVicker | 24/446 |
| 5,515,583 A | * | 5/1996 | Higashinaka | 24/445 |
| 5,659,930 A | * | 8/1997 | Okawa | 24/445 |
| 5,669,120 A | * | 9/1997 | Wessels et al. | 24/445 |
| 5,686,163 A | * | 11/1997 | Tsubata et al. | 428/92 |
| 6,357,487 B2 | | 3/2002 | Okawa | |

FOREIGN PATENT DOCUMENTS

| | | | | |
|---|---|---|---|---|
| CA | 0968137 | * | 5/1975 | 24/450 |
| CA | 0977532 | | 11/1975 | |
| DE | 195 55 211 A | | 7/1999 | |
| EP | 0 106 771 A | | 4/1984 | |
| EP | 0 581 570 A2 | | 7/1992 | |
| FR | 2364004 | * | 4/1978 | 24/450 |
| GB | 1 270 604 A | | 4/1972 | |
| JP | 5-154009 | | 6/1993 | |
| WO | WO 93/12687 | | 7/1993 | |

* cited by examiner

*Primary Examiner*—Victor Sakran
(74) *Attorney, Agent, or Firm*—Fish & Richardson PC

(57) ABSTRACT

A woven fastener product includes an array of hook elements and an array of loop elements that extend from the surface of different respective regions of a common fabric base. The arrays are formed by warp yarns, the arrays being separated in the warp direction of the fabric base. To form a self-engaged fastening, the fastener product is conformed so that the hook elements overlie the loop elements. Monofilament loops are shown sized and located to provide pin-receiving mounting sleeves as part of the woven structure.

30 Claims, 7 Drawing Sheets

WOVEN HOOK AND LOOP FASTENING

This application is a continuation (and claims the benefit of priority under 35 USC 120) of U.S. application Ser. No. 09/456,281, filed Dec. 7, 1999, now U.S. Pat. No. 6,546,603 which is a continuation-in-part of U.S. application Ser. No. 09/050,501, filed Mar. 30, 1998, U.S. Pat. No. 5,966,189.

BACKGROUND OF THE INVENTION

The invention generally relates to woven fastener products for use in hook-and-loop fastening and the like and to methods of their manufacture.

Woven fastener products include a fabric base from which an array of tiny fastener elements extend. The fastener elements are manufactured by projecting loops of yarns from the fabric base during the weaving process. Loops of multifilament yarns can function as female fastening elements. In other cases, loops of monofilament yarns can be cut and/or heated, after weaving, to produce male fastener elements having, for example, hook or mushroom shapes.

To form a closure, male fastener elements engage overlying female fastener elements. Certain fastener product have arrays that include both male and female fastener elements and thus can self-engage.

SUMMARY OF THE INVENTION

A woven fastener product is provided that includes an array of male fastener elements and an array of female fastener elements extending from a common fabric base and separated in the warp direction.

In one general aspect of the invention, a woven fastener product is featured that includes a fabric base having ground yarns including warp yarns and filling yarns that extend respectively in warp and filling directions. The woven fastener product, in the warp direction, has separate functional regions. The functional regions have respective fastener element arrays that include a plurality of rows of fastener elements. The fastener elements are yarns of the fabric base that project from a surface of the fabric base in selected locations. A first functional region includes a plurality of rows of loop-engaging fastener elements and is substantially free of loop fastener elements. A second functional region includes a plurality of rows of loop fastener elements and is substantially free of loop-engaging fastener elements.

Embodiments of this principle may include one or more of the following features.

The loop fastener elements are multi-filament yarns that extend across the warp direction of the woven fastener product, project from the fabric base at selected locations in the second functional region, and function as ground yarns of the fabric base in a region free of loop fastener elements. Preferred embodiments of this feature include one or more of the following. The region free of loop fastener elements is the first functional region. The fabric base includes a first fabric layer and a second fabric layer. The multi-filament yarns extend between and hold together the first fabric layer and the second fabric layer in the region free of loop fastener elements.

The loop-engaging fastener elements are monofilament yarns that project from the fabric base at selected locations in the first functional region, the monofilament yarns extend in a warp direction of the product and function as ground yarns of the fabric base in a region free of loop-engaging fastener elements. Preferred embodiments of this feature include one or more of the following. The region free of loop-engaging fastener elements is the second functional region. The fabric base includes a first fabric layer and a second fabric layer. The monofilament yarns extend between and hold together the first fabric layer and the second fabric layer in the region free of loop-engaging fastener elements.

The first functional region and the second functional region are separated in the warp direction by a region free of fastener elements. A preferred embodiment of this feature is that the region free of fastener elements includes multi-filament ground yarns that form loop-engaging fastener elements in the first functional region and monofilament ground yarns that form loop fastener elements in the second functional region.

The functional regions extend in the filling direction substantially across the width of the fastener product. The rows of fastener elements extend in the filling direction. The rows of fastener elements include more than two fastener elements. The fastener element arrays include more than two rows of fastener elements. The base fabric is a webbing having a thickness of at least 0.030 inches and a tensile strength in the warp direction of the webbing of at least 300 pound per lineal inch of width of the webbing. The loop-engaging fastener elements are hook elements.

The sides of the fastener product extending in the warp direction include integral edge portions that are enlarged, in cross-section, relative to a main body of the fabric base to serve as load-dissipating structures. A preferred embodiment of this feature is that the edge portions are woven tube structures.

At least some of the ground yarns are activated adhesive yarns that anchor the fastener elements to the woven base. Preferred embodiments of this feature include one or more of the following. The activated adhesive yarns are comprised of a heat-activatable substance. The activated adhesive yarns are comprised of a solvent-activatable substance.

The woven fastener product is in the form of a watch band. Preferred embodiments include one or more of the following. The watch band includes a region free of fastener elements adjacent one of the functional regions. The region free of fastener elements is suitable for attaching a timepiece thereto. A first end of the watch band is attached to a buckle. The buckle is constructed such that an opposite end of the watch band extends therethrough. The watch band is bent around the buckle to overlay the first functional region with the second functional region.

In another general aspect of the invention, a method of manufacturing a woven fastener product is featured. The woven fastener product includes a fabric base having ground yarns including warp yarns and filling yarns extending respectively in warp and filling directions. The woven fastener product, in the warp direction, has a first functional region separated from a second functional region. The functional regions have respective fastener element arrays that include a plurality of rows of fastener elements, the fastener elements extending from a surface of the fabric base. The method includes the following steps: projecting multi-filament yarns of the fabric base from the surface of the fabric base in selected locations in the second functional region to form an array of loop elements; projecting monofilament yarns of the fabric base from the surface of the fabric base in selected locations in the first functional region; and cutting the monofilament yarns projecting from the surface of the fabric base in the first functional region to form an array of loop-engaging elements being substantially free of loop elements.

Among other advantages, the woven fastener product provides separate regions of hook and loop elements that extend from a common fabric base making the product particularly suitable for applications, such as watch bands and sandal straps, that self-engage. Both the hook and loop regions are integrally formed with the fabric base. Thus, it is not necessary to separately attach individual hook fastener strips and loop fastener strips to a common fabric. This eliminates an expensive and difficult operation (e.g. sewing) and can improve the appearance and performance of the final product. For example, puckering is avoided, that can often occur in the sewing process, due to differential shrinkage of the separate components. Puckering can mar the appearance and sometimes compromises the function of the final product.

In some cases, the common fabric base is a webbing having strength suitable for use in load bearing applications. Additionally, the edges of the fastener products can be made relatively soft to the touch, thus making the product desirable for applications involving frequent handling or direct contact with flesh. Furthermore, the fabric base may have a flexible and/or soft texture because fastener elements are anchored without coating the backside of the product with a binder material which imparts roughness and stiffness to the base.

In an advantageous embodiment, monofilament loop rows are sized and positioned to define pin-receiving sleeves for mounting a device such as a watch by use of customary mounting pins of the body of the device.

BRIEF DESCRIPTION OF THE DRAWINGS

FIG. 8b is a plan view of the assembly of FIG. 8a.

DESCRIPTION OF THE PREFERRED EMBODIMENTS

Figure 1:
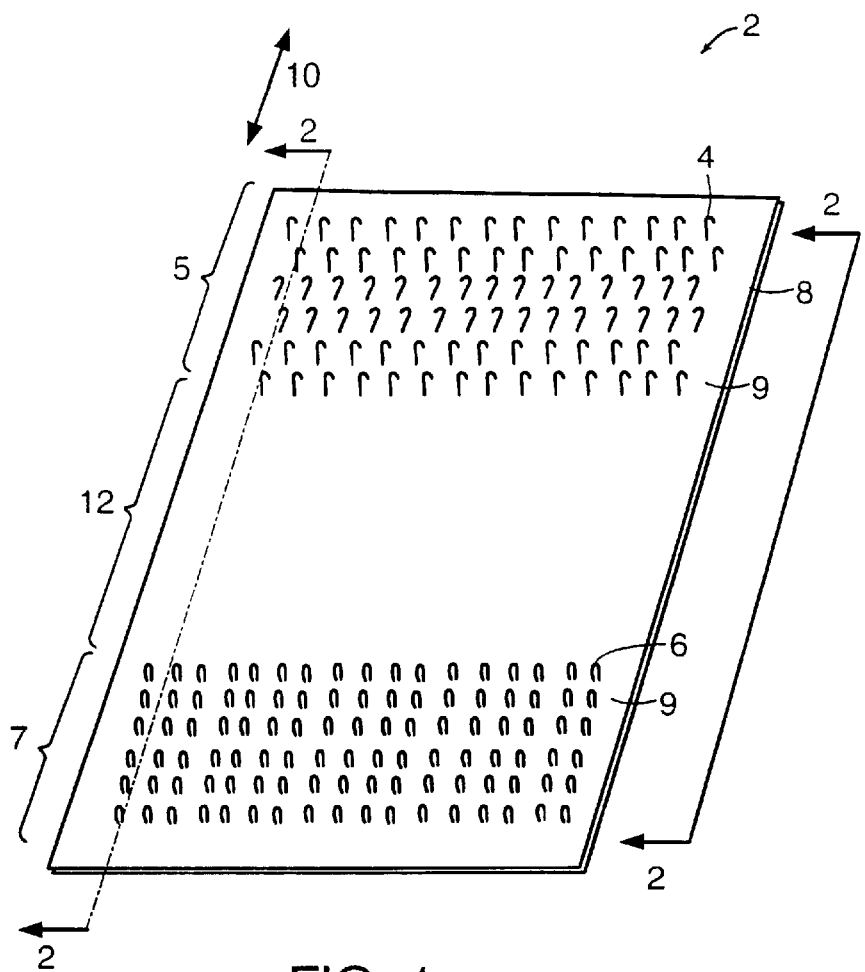
FIG. 1 is a diagrammatic view of a woven fastener product having separate hook fastener element and loop fastener element arrays.
Figure 2:
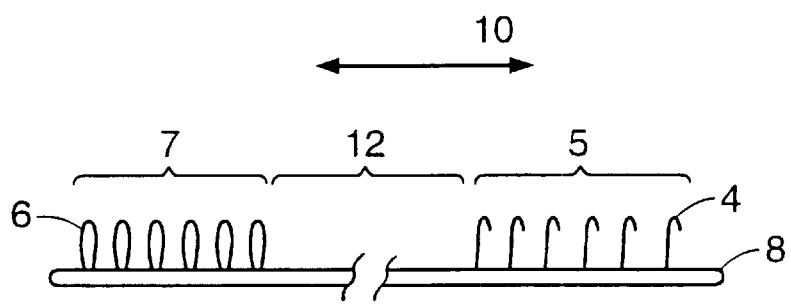
FIG. 2 is a cross-section of the woven fastener product of FIG. 1 in the warp direction taken along line 22.

Referring to FIGS. 1–5, a woven fastener product 2 includes an array of hook elements 4 and an array of loop elements 6 that project from different respective regions 5, 7 of a woven fabric base 8. The hook element region 5 and the loop element region 7 are separated in the warp direction, axis 10, of the fabric base 8 by a region 12 free of fastener elements. As described further below, the hook and loop elements are formed from yarns of the fabric base 8 that project from a surface of the fabric base in selected locations. The fastener product 2, in use, is self-engageable by bending the fabric base 8 such that the hook elements overlie the loop elements. Secure closures can be formed by aligning the hook and loop arrays to engage a large percentage of the fastener elements.

The arrays of hook elements 4 and loop elements 6 include rows 9 of respective fastener elements that extend in the filling direction of the fabric base 8. Each row 9 has more than two fastener elements. For fastener products having a width of one inch, more typically each row includes more than eight fastener elements, and in some cases greater than fifteen fastener elements. As illustrated in the embodiment of FIG. 1, the rows 9 extend substantially across the width of the fastener product 2 while in other cases, the rows may extend for only a fraction of the width. Hook element regions 5 and loop element regions 7 have at least two rows 9, often greater than five rows, and in many cases greater than ten rows. The size and arrangement of the fastener element arrays, such as the number of rows and fastener elements per row, can thus be varied for different fastener applications. Respective rows 9 in the hook region 5 may have hook elements 4 oriented in opposite directions, as shown.

Typically, but not exclusively, hook elements 4 have heights in the range of 0.050 inches to 0.10 inches and the hook element array includes greater than 100 hook elements per square inch and, in some cases, greater than 500 hook elements per square inch. Generally, loop elements 16 have heights on the order of 0.050 inches to 0.150 inches. The density of the loop array can be up to five to twenty times greater than that of the hook array because, as described further below, loop elements are made from multi-filament yarns with each filament capable of forming a loop element, while hook elements are made from monofilament yarn.

The method of manufacturing the fastener product 2 does not place requirements on the heights of the hook elements 4 relative to the loop elements 6. For example the hook elements may be shorter than loop elements, taller than loop elements or the same size as the loop elements.

The thickness of the fabric base 8 is primarily determined by the load that the product must withstand in use. Typically, the fabric base 8 of the fastener product has a thickness between 0.012 inches and 0.10 inches, but in some cases, can have thicknesses up to 0.50 inches or even greater. For the purpose of this application, fastener products having a base greater than 0.030 inches and a tensile strength in the warp direction of at least 300 pounds per lineal inch of width are defined as fastener webbings. Fastener webbings are suitable for use in load-bearing applications and also can be used to enhance appearance and for handling purposes. Fastener products having thinner bases than 0.030 inches are defined as fastener tapes which are used in applications involving relatively light loading.

Figure 3:
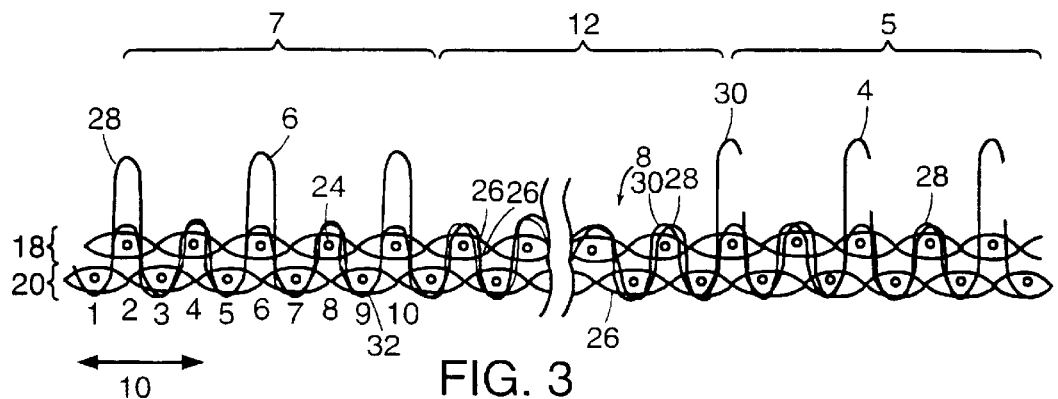
FIG. 3 is a cross-section in the warp direction of a portion of a woven fastener product having separate hook and loop arrays.
Figure 4:
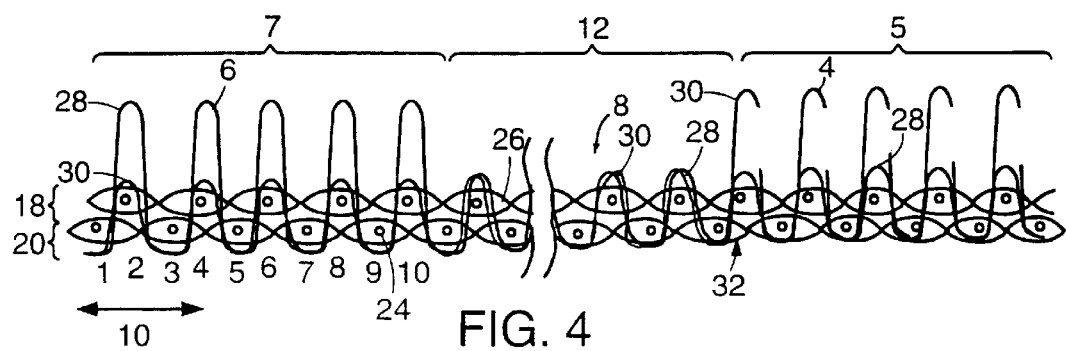
FIG. 4 is a cross-section in the warp direction of a portion of a woven fastener product having high density hook and loop arrays.
Figure 5:
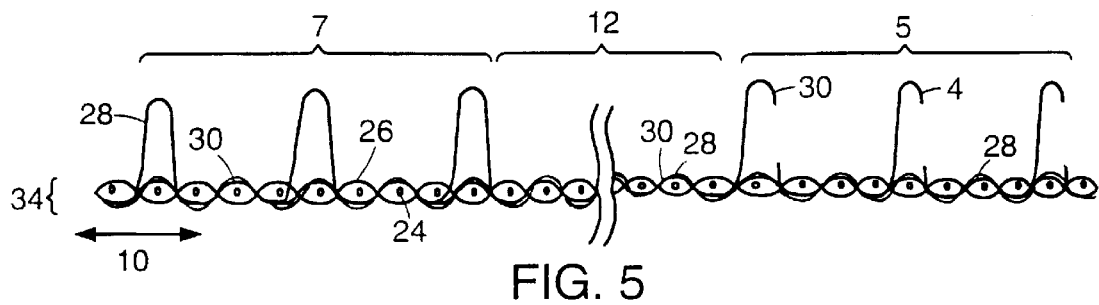
FIG. 5 is a cross-section in the warp direction of a portion of a woven fastener product having a single base fabric layer.

Referring to FIGS. 3–5, the fabric base 8 is made of an interlacing pattern of ground yarns. Ground yarns include warp yarns 26 that extend in the warp direction and filling yarns 24, illustrated by small circles, that extend in the filling direction. The small circles can represent a single filling yarn or, in other cases, may comprise a bundle of filling yarns.

Examples of warp yarn and filling yarn, respectively, are multifilament Nylon-6 (280 deniers/14 filaments, 20 deniers per filament (dpf)) and multifilament Nylon-6 (100 deniers/34 filaments, 2.94 dpf). An adhesive yarn (250 deniers/1 filament) may also be included in a bundle of filling yarns which, as described further below, can be activated to secure the fastener elements to the base fabric.

The embodiments of FIGS. 3 and 4 have a first fabric layer 18 and a second fabric layer 20. To form the respective fabric layers 18, 20, warp yarns 26 pass above and below filling yarns 24 in the respective layers, in an alternating manner. The embodiment of FIG. 5 has a single fabric layer 34 in which the warp yarns 26 are interlaced with one row of filling yarns 24 to form the single layer structure.

Multi-filament yarns 28, shown schematically in FIGS. 3–5 by single lines, run in the warp direction continuously across the length of the fastener product. In loop element regions 7 of the fastener product, the multi-filament yarns 28 are used to form loop elements 6 by a well-known weaving technique. The technique involves passing the multi-filament yarns 28 over lancettes, which are wires selectively positioned above the surface of the base fabric 8 and extend in the warp direction. Multi-filament yarns 28 are thus interlaced between the lancettes and filling yarns 24 of the lower fabric layer 20. The lancettes are subsequently withdrawn to form loop elements that project from the surface of the base fabric 8.

Each individual filament of the multi-filament yarn 28 functions as a loop element 6 suitable for engagement by hook elements 4. In most cases, however, a hook element 4 engages multiple loop elements 6 that project from the same point of the base fabric 8.

In regions 5, 12, free of loop elements 6, the multi-filament yarns 28 are interlaced between consecutively numbered filling yarns 24 in the upper and lower fabric layers 18, 20 in the embodiments of FIGS. 3 and 4. The multi-filament yarns 28 function as ground yarns of the fabric base 8 that hold the two fabric layers together, in regions 5, 12, thus eliminating the need for a separate stitching yarn that performs this function.

Examples of multi-filament yarn suitable for making loop elements include Nylon-6 (200 deniers/10 filaments) and Nylon-6 (280 deniers/14 filaments).

Monofilament yarns 30 are also continuously interlaced between the filling yarns 24 of the upper and lower fabric layers 18, 20 during the weaving process. In the hook element region 5, lancettes are used, as described above, to form monofilament loops that project from the surface. The monofilament loops are heat set and cut, as described further below, to produce hook shape elements. In regions of the fastener product 7, 12, free of hook elements, the monofilament yarns 30 function as ground yarns that hold the upper and lower fabric layers 18, 20 together in the embodiments of FIGS. 3 and 4.

Monofilament yarns suitable for forming fastener elements typically have diameters in the range of 0.006 inches to 0.012 inches and are composed of polyester or nylon. For products that are exposed to water, polyester yarns are preferred because polyester does not absorb moisture which can sacrifice loop-engaging ability. Other types of fastener elements may be formed during weaving or in a post-processing step, for example by melting the filaments with a hot wire to produce mushroom shaped fasteners.

In the embodiment of FIG. 3, hook elements 4 and loop elements 6 project from the surface of the base fabric 8 in their respective regions, every four filling yarns 24. As illustrated, loop elements 6 project over filling yarn number two, number six, and number ten. The embodiment of FIG. 4 has a higher density of fastener elements with hook elements 4 and loop elements 6 extending from the surface every two filling yarns in their respective regions. In this case, loop elements project over filling yarn number two, number four, and number six.

Fastener products having separate hook arrays and loop arrays are produced by cutting monofilament loop elements in the hook regions 5 without cutting multifilament loop elements in the loop regions 7. One method of selectively cutting loops employs a cutting device moveable relative to the surface of the fastener product from a cutting position to a non-cutting position. To produce an array of hook elements 4, the cutting device is moved to the cutting position such that the cutting implements, for example reciprocating blades, shear the monofilament loops across the width of the array. An insignificant percentage of the loop elements may remain uncut in the hook element region 5 due to the cutting device occasionally not severing a small number of the loop elements. In the loop element region 7, to retain the multi-filament loops formed in the weaving process, the cutting device is moved away from the fastener product surface to a non-cutting position to prevent cutting the loop elements and to produce loop element arrays free of hook elements.

In an alternative method of manufacturing the fastener product having separate hook and loop arrays, the product moves relative to a fixed cutting device to selective cutting of the loop elements.

Hook elements 4 and loop elements 6 can be secured to fabric base 8 with a variety of techniques to prevent separation of the fastener elements from the base during use. In one case, a solvent or water-based mixture of a binder material, for example polyurethane or acrylic latex, is applied to a back surface 32 of fabric base 8 using a roller coater. The solution fully impregnates the fabric of base. A vaporization process, for example heating, evaporates the liquid component of the mixture and cures the binder material which anchors the bottom of the fastener elements to the fabric base 8.

In an implementation preferred in many cases, the binder material is a component in adhesive yarns which are incorporated into base fabric 8 as ground yarns (e.g. filling yarns or warp yarns) or bundles of ground yarns. In particular, using adhesive yarns is desirable in fastener webbings having relatively thick bases or two fabric layers (as depicted in FIGS. 3 and 4) due to the difficulty in fully impregnating the fabric base.

Adhesive yarns have a component that is activated to form a binder layer as by a heat treatment process or a solvent process. Heat-activated adhesive yarns include a low melting temperature component, for example, a polypropylene-based adhesive having a melting temperature between approximately 150° Celsius to 160° Celsius, or a low melting temperature Nylon having a melting temperature between approximately 800 Celsius to 180° Celsius. In certain preferred cases, the low melting temperature component may be a coating on a core material that has a higher melting temperature, for example Nylon-6 having a melt temperature between approximately 230° Celsius to 235° Celsius. In other cases the adhesive yarn is made entirely of the low melting temperature constituent. In the heat treatment process, in either case, the fastener product is heated to a temperature and for a time period that melts the low-melting temperature constituent but does not melt warp yarns, filling yarns or the core material, if present. The melted constituent flows into intimate contact with the other yarns to form a matrix which anchors fastener elements to base.

Solvent-activated adhesive yarns have a binding material constituent that is readily dissolvable in a solvent, for example, a polyurethane-based material which dissolves in toluene or methyl ethyl ketone (MEK). The base is completely impregnated with the solvent to soften and cause the binding constituent to flow to again form a bonded matrix. The solvent is evaporated leaving the binding material in anchoring relationship with the bottom of fastener elements to fabric base.

Weaving techniques, themselves, may also be employed to secure fastener elements to fabric base. By using a tight weave for the fabric base, fastener elements are secured between adjacent warp yarns which provide enough force to prevent separation of the fastener elements from base during use. A tight weave is characterized by having a close fitting fabric construction which can be the result of several factors including employing a high density of warp and filling yarns per unit area of the base and/or employing a large diameter of warp and filling yarns.

Another weaving technique can be employed to secure the fastener hooks which involves securing fastener elements to the fabric base with the interlaces between fastener element yarn and filling yarns. The interlaces can act as anchoring points which prevent fastener elements from being pulled away from base during use. Typically, woven fastener products include one to four interlaces of fastener element yarn with warp yarns between consecutive fastener elements, which generally does not provide sufficient anchoring force. By increasing the number of interlaces between consecutive fastener elements to ten, for example, it is possible to adequately secure fastener elements to base.

Weaving techniques for anchoring fastener elements to the fabric base 8 may be used in combination with a binder material to reinforce the anchoring. In cases where fastener tape is frequently handled it may be advantageous to avoid coating the back surface 32 with a water or solvent-based binder material which, when cured, can give the tape a stiff or rough surface. Thus by using other methods, such as incorporating adhesive yarns into the fabric or the above-described weaving techniques, it is possible to create a product with a highly flexible and "kind" back surface. Using adhesive yarns has been shown to be particularly effective for the purposes of combining excellent securement of fastener elements with the desirable handling qualities mentioned above.

Figure 6:
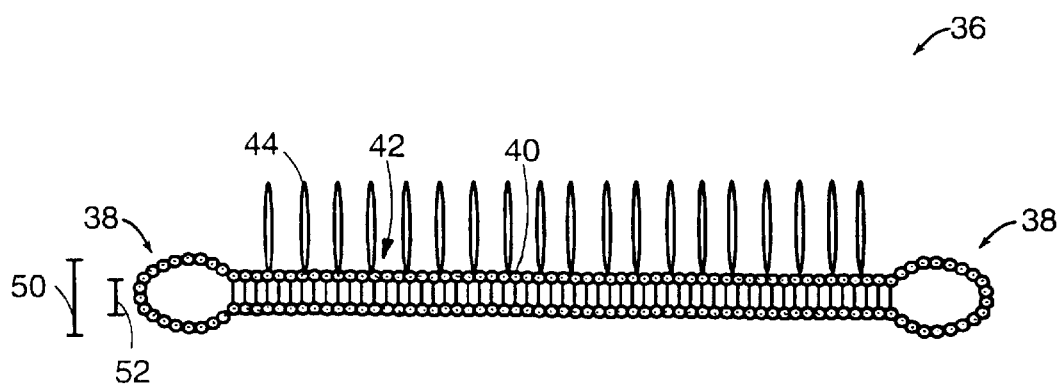
FIG. 6 is a cross-section in the filling direction of a woven fastener product that includes soft edges.
Figure 6A:
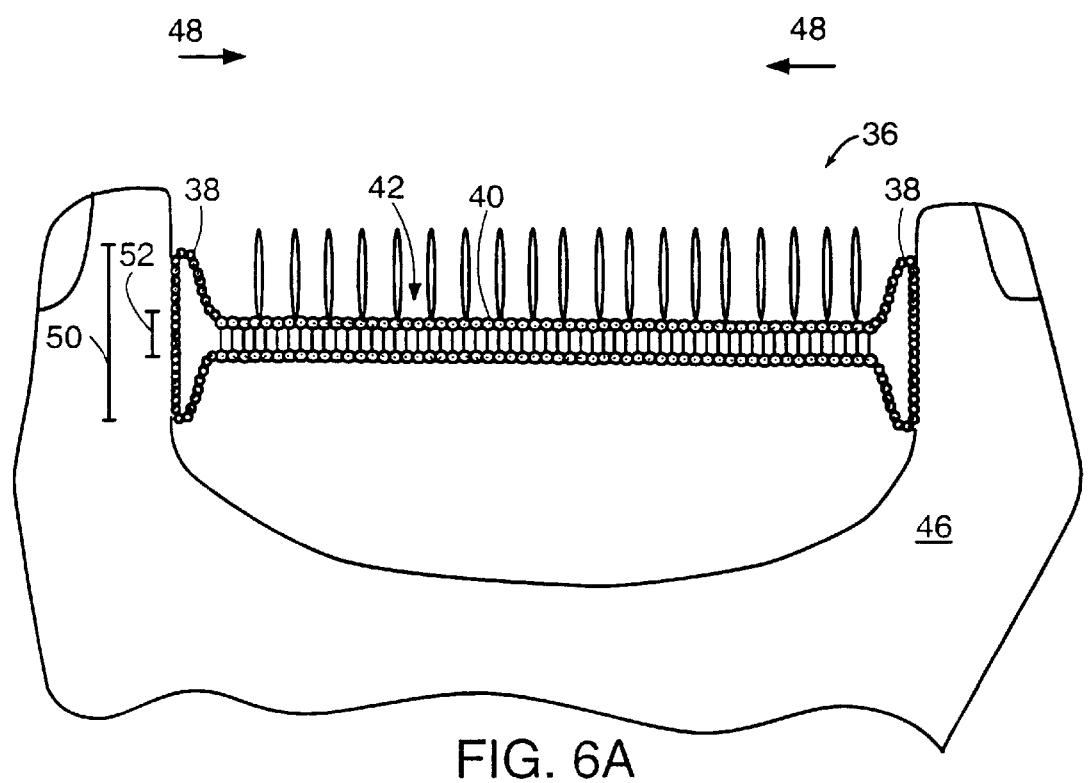
FIG. 6A schematically illustrates a hand applying a force to the edges of the woven fastener product of FIG. 6.

Referring to FIGS. 6 and 6A, in a particularly useful embodiment of the invention, a fastener product 36 has soft edges 38 that extend along warp direction sides of the product which dissipate applied forces to allow a user to comfortably touch the edges of the product. Fastener products with soft edges have been described in the pending application by one of the present inventors (application Ser. No. 09/050,501, filed Mar. 30, 1998, entitled "Woven Fastener Product"), the entire contents of which are incorporated herein by reference. Soft edges 38 are characterized by having a thicker cross-section than the main body 40 of the base fabric 42, from which fastener elements 44 project. In some cases, the soft edges are tube structures, as illustrated, or in other case the edges are formed by thicker yarns.

In the absence of a compressive force, the tube structure at each edge 38 is typically flat, having no internal member to define the tube shape. (FIG. 6) The tube structure has a thickness 50 at least greater than the thickness 52 of the main body 40. When a force is applied to each edge of a fastener product 36 by a hand 46 in the direction indicated by arrows 48, the tube structures are compressed in the direction of arrows, thus increasing thickness and the area of tube structure in contact with hand. (FIG. 6A) The thickness 50 of the compressed tube structure is significantly greater than the thickness 52 of the main body 40. The pressure felt by hand as it applies the force to edge is representative of the softness of the edge. (Pressure being equal to force divided by area.) The greater thickness over which force is applied, results in relatively low pressure and the edge having the tube structure feels softer than would an edge having the thickness of the main body.

Figure 7:
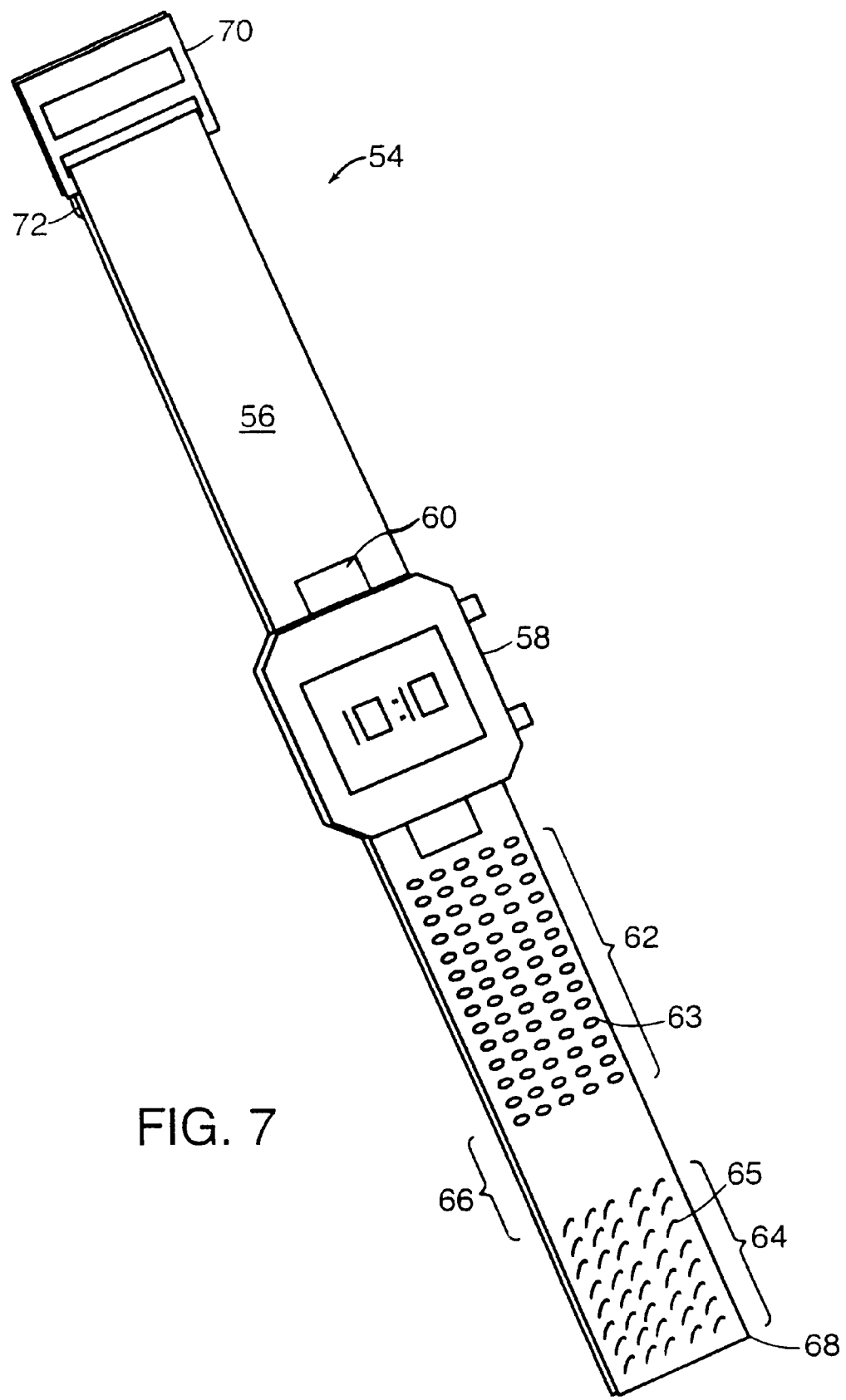
FIGS. 7 and 7A show the woven fastener product being used as a watch band.
Figure 7A:
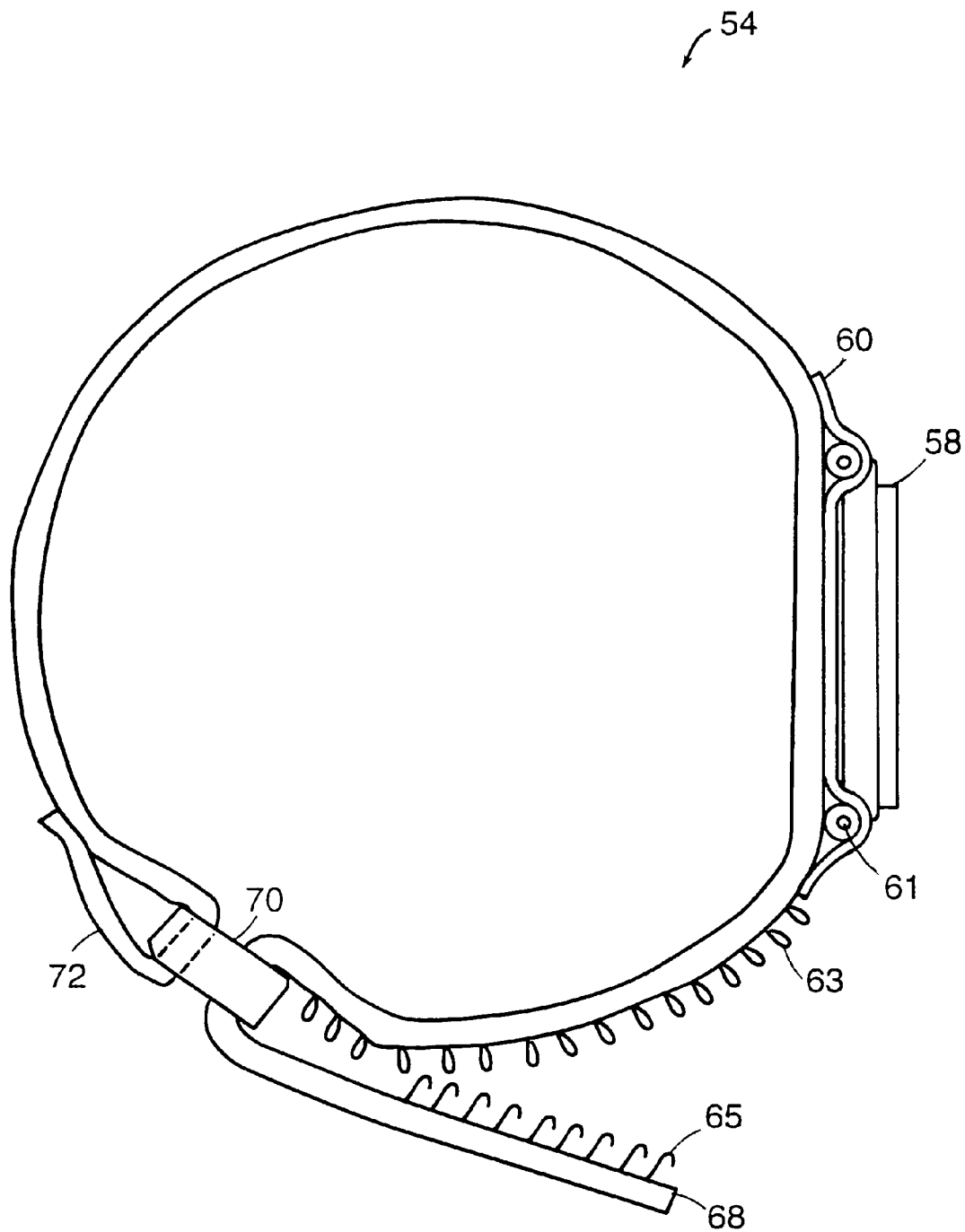

To illustrate one of the many examples of the woven fastener product in use, FIGS. 7 and 7A, show a watch 54 that includes a woven fastener webbing 56 that functions as a self-fastening watch band. A timepiece 58 is mounted on the woven fastener webbing 56 using an elastic ribbon 60 that is sewn to the fastener webbing and passes over pins 61 projecting from sides of the timepiece. The timepiece 58 is positioned adjacent an array 62 of loop elements 63 that extends for about 3.0 inches down the length of the webbing 56, in the warp direction, and is separated from an array 64 of hook elements 65 by a region 66 free of fastener elements. The hook element array 64 extends about 1.0 inches 56 in the warp direction to a distal end 68 of fastener webbing 56. To secure the watch 54, the distal end 68 is passed through a buckle 70 attached to an opposite end 72 of the fastener webbing 56 and the fastener webbing is bent around the buckle to align the hook element array 64 with the loop element array 62. The hook elements 63 engage the loop elements 65 to fasten the watch around the wrist of a user. By adjusting the extent of the fastener webbing 56 pulled through the buckle 70, the watch can be conformed to fit different users.

Figures 8, 8A:
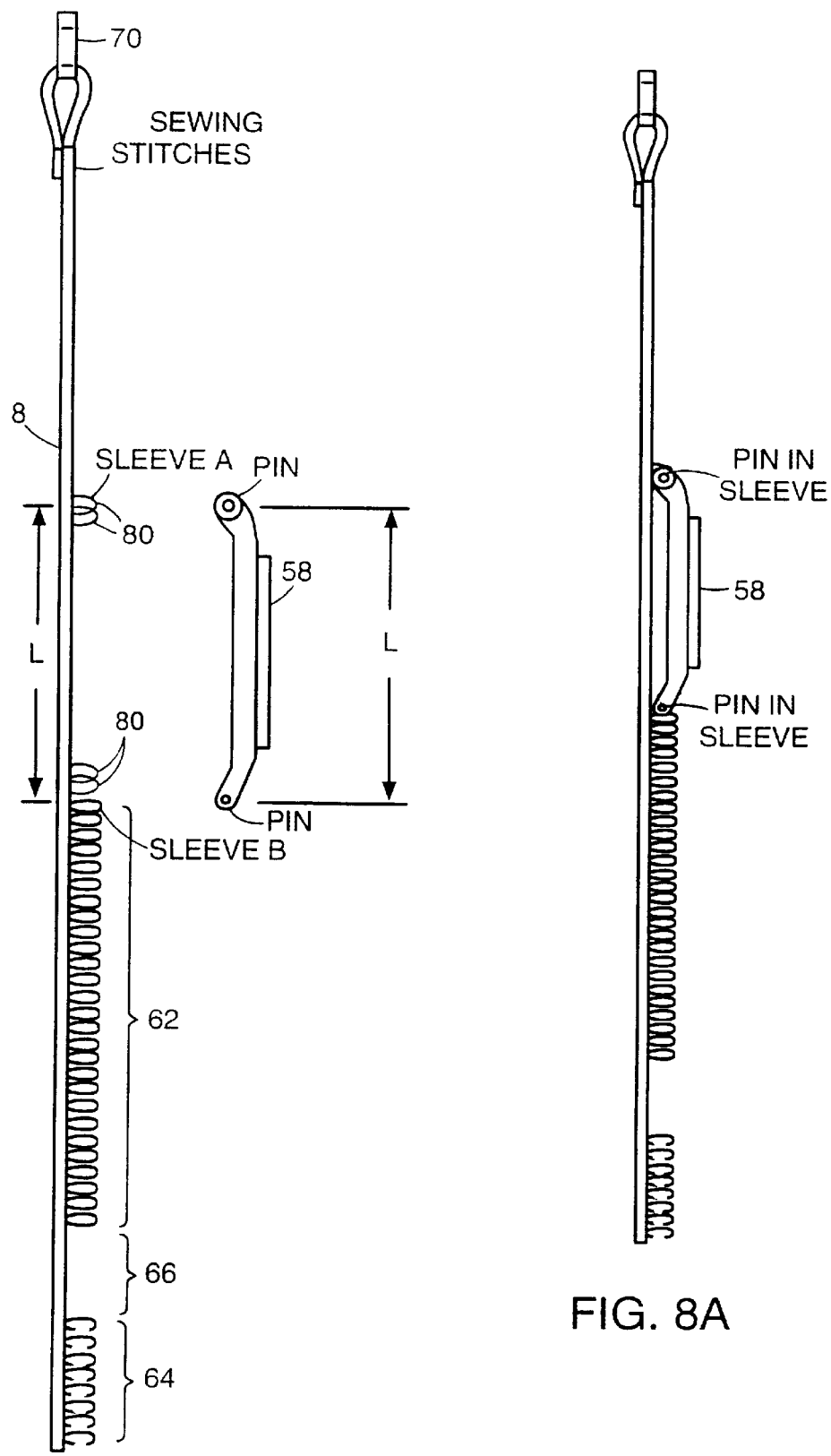
FIG. 8 is a side view which shows another embodiment of a woven fastener wrist band incorporating woven pin-receiving sleeves, for housing the pins of a watch.
FIG. 8a is a similar view which shows the watch assembled on to the wrist band.
Figure 8B:
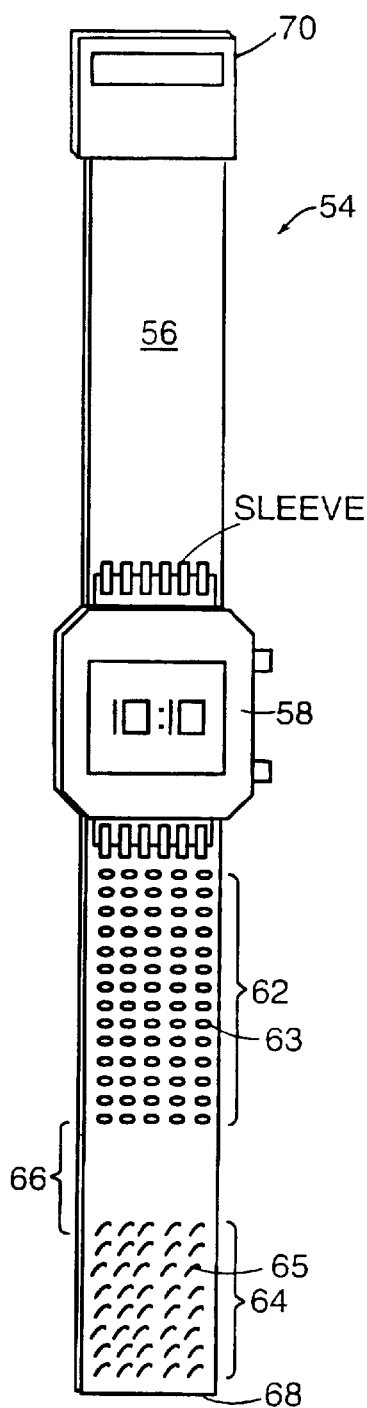
Figure 8C:
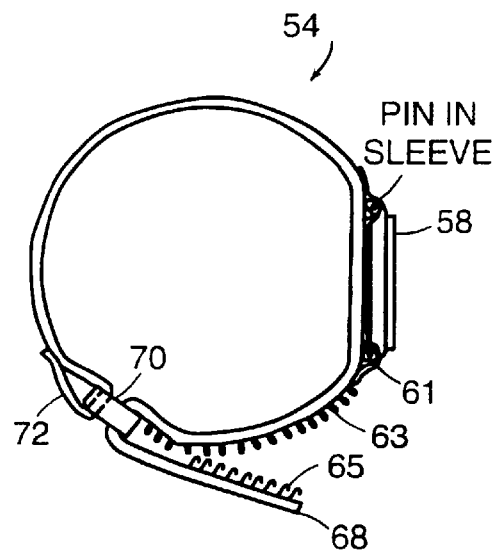
FIG. 8c is a view showing the band wrapped as it is when secured to a wrist and FIG. 8d is a magnified diagrammatic view of monofilament loops that cooperate to form a sleeve.
Figure 8D:
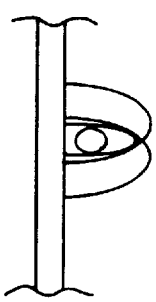

The embodiment of FIGS. 8–8c is similar to that of FIGS. 7 and 7a except that it combines a novel feature for securing the watch to the band. The feature comprises rows of monofilament loops 80 that are woven into the base webbing 8, to form pin-receiving sleeves. By weaving the band such that there is a sleeve A spaced apart a distance 1 from sleeve B that corresponds to the spacing 1 between pins of a watch or similar device, a mount is defined for a watch merely by the weaving of the band. The pins are inserted in the sleeve and then in the retention holes in the receiving ears of the watch body to secure the watch to the band.

Portions of the same monofilaments that form hooks and the base can form such sleeves at strategic locations or additional or different monofilaments can be employed.

Additional embodiments are also within the scope of the following claims.

What is claimed is:

1. A fastener product comprising:
   a base comprising first and second fabric layers, at least one of the first and second fabric layers comprising woven warp and filling yarns;
   the base also including an array of fastener elements extending from one side of the base and comprising portions of fastener element yarns woven into one of the fabric layers; and
   an adhesive yarn having a constituent activatable to flow into intimate contact with the woven yarn of the at least one of said first and second fabric layers of said base to anchor said fastener elements to said base.

2. The woven fastener product of claim 1, wherein the adhesive yarn is heat-activated having a melting temperature less than the melting temperature of the warp and filling yarns.

3. The woven fastener product of claim 1, wherein an edge portion of the fastener product comprises a resilient, woven tube structure.

4. The woven fastener product of claim 3, wherein the tube structure is formed by a margin portion that joins the first and second layers.

5. The woven fastener product of claim 1, wherein the first and second fabric layers are bound by a binding yarn, the adhesive yarn disposed between the first and second fabric layers.

6. The woven surface fastener of claim 5, wherein the binding yarn binds the first and second fabric layers at predetermined intervals in the machine direction.

7. The woven fastener product of claim 1, wherein the base comprises a tubular structure and the adhesive yarn is woven into the base in the filling direction.

8. The woven fastener product of claim 1, wherein the engaging element yarn is woven into the first fabric layer and the fastener elements extend from a surface of the first fabric layer.

9. The woven fastener product of claim 1, wherein the engaging element yarn is woven into the second fabric layer and the fastener elements extend from a surface of the first fabric layer.

10. The woven fastener product of claim 1, wherein a binding yarn binds the first and second fabric layers, the binding yarn disposed in the filling direction in substantially the same direction as the fastener element yarn.

11. The woven fastener product of claim 1 comprising
a first functional region including a plurality of rows of loop-engaging fastener elements and being substantially free of loop fastener elements, and
a second functional region including a plurality of rows of loop fastener elements and being substantially free of loop-engaging fastener elements.

12. The woven fastener product of claim 11, wherein the fastener element yarn forming the loop fastener elements comprises a multi-filament yarn projecting from the base at selected locations in the second functional region, the multi-filament yarn extending across the warp direction of the woven fastener product and functioning as ground yarns of the base in a region free of loop fastener elements.

13. The woven fastener product of claim 12, wherein the region free of loop fastener elements comprises the first functional region.

14. The woven fastener product of claim 12, wherein the multi-filament yarn extends between and holds together the first fabric layer and the second fabric layer in the region free of loop fastener elements.

15. The woven fastener product of claim 11, wherein the fastener element yarn forming the loop-engaging fastener elements comprise a monofilament yarn projecting from the base at selected locations in the first functional region, the monofilament yarn extending in a warp direction of the product and functioning as ground yarns of the base in a region free of loop-engaging fastener elements.

16. The woven fastener product of claim 15, wherein the region free of loop-engaging fastener elements comprises the second functional region.

17. The woven fastener product of claim 15, wherein the monofilament yarn extends between and holds together the first fabric layer and the second fabric layer in the region free of loop-engaging fastener elements.

18. The woven fastener product of claim 11, wherein the functional regions extend in the filling direction substantially across the width of the fastener product.

19. The woven fastener product of claim 11, wherein the first functional region and the second functional region are separated in the warp direction by a region free of fastener elements.

20. The woven fastener product of claim 19, wherein the region free of fastener elements includes multi-filament ground yarns that form loop-engaging fastener elements in the first functional region and monofilament ground yarns that form loop fastener elements in the second functional region.

21. The woven fastener product of claim 11 in the form of a watchband.

22. The woven fastener product of claim 21, wherein the watch band includes a region free of fastener elements adjacent one of the functional regions, the region free of fastener elements suitable for attaching a timepiece thereto.

23. The woven fastener product of claim 21, wherein a first end of the watch band is attached to a buckle, the buckle constructed such that an opposite end of the watch band extends therethrough, the watch band being bent around the buckle to overlay the first functional region and the second functional region.

24. The woven fastener product of claim 1, wherein the array of fastener elements comprises multiple rows of fastener elements extending in the filling direction.

25. The woven fastener product of claim 1, wherein sides of the fastener product extend in the warp direction include integral edge portions that are enlarged in cross section relative to a main body of the fabric base to serve as load-dissipating structures.

26. The woven fastener product of claim 25, wherein the edge portions comprise woven tube structures.

27. The woven fastener product of claim 1, wherein the base comprises a webbing having a thickness of at least 0.030 inches and a tensile strength in the warp direction of the webbing of at least 300 pound per lineal inch of width of the webbing.

28. The woven fastener product of claim 1, wherein the adhesive yarn is comprised of a solvent-activatable substance.

29. The woven fastener product of claim 1, wherein the fastener elements comprise loop-engaging fastener elements.

30. The woven fastener product of claim 1 having woven loops that form pin-receiving sleeves for mounting a device or watch to the fastener product.

* * * * *